(12) United States Patent
Glora

(10) Patent No.: US 7,133,760 B2
(45) Date of Patent: Nov. 7, 2006

(54) METHOD FOR CONTROLLING THE SPEED OF A VEHICLE

(75) Inventor: Michael Glora, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 415 days.

(21) Appl. No.: 10/700,539

(22) Filed: Nov. 5, 2003

(65) Prior Publication Data

US 2005/0065704 A1    Mar. 24, 2005

(30) Foreign Application Priority Data

Nov. 6, 2002    (DE) ................. 102 51 563

(51) Int. Cl.
G06F 7/00 (2006.01)
G06F 17/00 (2006.01)

(52) U.S. Cl. .............. 701/95; 701/93; 701/96; 477/110

(58) Field of Classification Search ............ 701/93–95; 477/107, 110; 180/170
See application file for complete search history.

(56) References Cited

U.S. PATENT DOCUMENTS

| | | | |
|---|---|---|---|
| 4,845,621 A | | 7/1989 | Kawata et al. |
| 4,860,210 A | * | 8/1989 | McCombie .................. 701/93 |
| 4,870,583 A | * | 9/1989 | Takahashi et al. ............ 701/93 |
| 4,933,859 A | | 6/1990 | Tsuyama et al. |
| 5,038,880 A | | 8/1991 | Matsuoka et al. |
| 5,243,023 A | * | 9/1993 | Dezern ....................... 528/331 |
| 5,484,350 A | * | 1/1996 | Ishikawa et al. .............. 477/97 |
| 5,685,801 A | * | 11/1997 | Benford et al. ............. 477/108 |
| 5,758,306 A | * | 5/1998 | Nakamura ................... 701/93 |
| 5,778,331 A | * | 7/1998 | Leising et al. ................ 701/66 |
| 5,794,735 A | * | 8/1998 | Sigl ........................... 180/170 |
| 5,835,878 A | * | 11/1998 | Saito et al. ................... 701/94 |
| 6,052,644 A | * | 4/2000 | Murakami et al. ........... 701/93 |
| 6,067,496 A | * | 5/2000 | Benoliel et al. .............. 701/93 |
| 6,374,173 B1 | * | 4/2002 | Ehlbeck ....................... 701/93 |
| 6,473,000 B1 | * | 10/2002 | Secreet et al. ............. 340/936 |
| 6,591,181 B1 | * | 7/2003 | Hellmann et al. ............ 701/96 |
| 6,681,170 B1 | * | 1/2004 | Winner et al. ................ 701/93 |
| 2002/0177935 A1 | * | 11/2002 | Winner et al. ................ 701/93 |
| 2003/0033073 A1 | * | 2/2003 | Kichima et al. .............. 701/96 |

FOREIGN PATENT DOCUMENTS

DE    100 47 748    *   4/2002

OTHER PUBLICATIONS

Winner et al., Adaptive cruise control system aspects and development trends, SAE 96, Feb. 26-29, 1996, pp. 1-10, No. 961010, Detroit.*

* cited by examiner

Primary Examiner—Cuong Nguyen
(74) Attorney, Agent, or Firm—Walter Ottesen

(57) ABSTRACT

A method is directed to the control of the speed of a vehicle wherein the actual speed is caused to track the desired speed. For reducing the actual speed, a transmission (1) of the vehicle (5) is driven to downshift and thereby the brake system is protected with respect to wear and overheating.

8 Claims, 4 Drawing Sheets

METHOD FOR CONTROLLING THE SPEED OF A VEHICLE

RELATED APPLICATION

This application claims priority of German patent application 102 51 563.8, filed Nov. 6, 2002, the entire contents of which is incorporated herein by reference.

BACKGROUND OF THE INVENTION

Modern driver assistance systems are known which, for example, include a vehicle speed controller or an adaptive vehicle speed controller having brake intervention. These vehicle speed controllers can drive a drive unit as well as a brake system of a vehicle via suitable interfaces. Here, it must be avoided as best as possible that brake system and drive unit operate in opposition to each other. For this reason, a brake intervention via the vehicle speed controller is not enabled when there is a drive of the drive unit with a drive torque which is greater than the minimum possible drive torque referred to the instantaneous gear. In active brake control via the vehicle speed controller, the minimum possible drive torque referred to the instantaneous gear is requested by the drive unit. Because of such a drive, the drive unit is driven during braking at the minimum possible torque. The drive unit can cause the transmission to adjust the maximum possible gear which is permitted at the instantaneous speed of the vehicle. With this gear selection, the case can occur that the engine rpm assumes such low values that no overrun switchoff of the engine is possible and fuel must be consumed notwithstanding the braking. Even if the engine rpm permits an economical overrun switchoff, no optimal support or relief of the brake system is obtained via the described gear selection.

SUMMARY OF THE INVENTION

The method of the invention for controlling the speed of a vehicle affords the advantage with respect to the foregoing that, for the control of the speed of the vehicle, an actual speed is caused to track a desired speed. A transmission of the vehicle is driven for downshifting to reduce the actual speed. With the downshifting of the transmission, a larger transmission ratio of the transmission results and a larger overrun torque, in magnitude, is achieved. In this way, an effective relief of the brake system is realized. A relief of load of this kind reduces not only the wear of the brake system but also avoids an overheating of the brakes especially in downhill travel over a longer distance.

To utilize the overrun torque, an overrun switchoff is furthermore ensured at higher engine rpms and therefore a more economical operation of the vehicle is ensured. A further advantage of the method of the invention results also for vehicle speed controllers or adaptive vehicle speed controllers without brake intervention. In this case, the downshifting and the larger overrun torque, in magnitude, associated therewith effects a reduced control deviation between the actual speed and the desired speed, for example, during downhill travel.

When the transmission, in addition to driving a brake of a vehicle is driven to reduce the actual speed, then, in addition to the relief of the brake, also an overall greater braking action and therefore a more effective and more rapid reduction of the actual speed is realized for tracking the desired speed.

It is especially advantageous that the transmission is driven to downshift when the output quantity of the drive unit, which is requested by the control, drops below a second value which is expected to adjust for the overrun operation in the next lower transmission stage. In this way, the downshift is only carried out when the value for the output quantity, which results in the next lower transmission stage, for example, the corresponding overrun torque, can be used completely for reducing the actual speed. If the drive torque is viewed as the output quantity of the drive unit, then it is therefore not necessary to adjust a drive torque which lies between the overrun torques of two mutually adjacent gear stages. The adjustment of such a drive torque can not be realized without adapting the engine torque. A change of the engine torque, for example, an increase of the engine torque when downshifting the transmission can, however, be unwanted especially during a braking phase. Such a change of the engine torque and therefore the adjustment of a drive torque between the overrun torques of two mutually adjacent gear stages is, however, prevented when the transmission is driven only then for downshifting when the output quantity of the drive unit, which is requested by the control, drops below the second value which is expected to adjust for the overrun operation in the next lower transmission stage. In the case of the additional drive of a brake of the vehicle for reducing the actual speed, an output quantity, which is requested by the control and which lies between the values of two mutually adjacent transmission stages, can be realized only by a corresponding drive of the brake and an adjustment of the brake action. The overrun torque of the instantaneous gear stage can be used without having to change the engine torque.

A further advantage results when the transmission is driven to downshift after a preferably applicable pregiven time after the start of the drive of the brake for reducing the actual speed. In this way, the downshift of the transmission for reducing the actual speed can be optimized on the basis of experience values, especially when the vehicle speed control or the adaptive vehicle speed control realizes the tracking of the actual speed to the desired speed with the aid of acceleration or deceleration requests and not by means of torque requests. The acceleration or deceleration requests can not be assigned clearly to corresponding transmission stages. Because of the downshift of the transmission after a pregiven time since the start of driving the brake, this deficit can be compensated with the aid of experience values.

A further advantage is that the transmission is driven to downshift in dependence upon an accelerator pedal value and that the accelerator pedal value is iteratively increased for a requested downshift of the transmission. This solution is especially simple to execute and is especially useful in the case wherein the vehicle speed control is realized on the basis of torque requests and therefore the time point for the downshift is defined in that the drive torque, which is requested by the vehicle speed control or the adaptive speed control, corresponds to the overrun torque of the next lower gear stage or transmission stage.

A further advantage is that the accelerator pedal value is changed in dependence upon a difference between an initial deceleration request with the activation of the brake system and an instantaneous deceleration request to the brake system. This solution is, in turn, especially suitable for the case wherein the vehicle speed control or the adaptive vehicle speed control is realized not on the basis of the torque requests but on the basis of acceleration requests or deceleration requests. Compared to the previously described time criterion, this solution affords the advantage that this solution makes the change of the accelerator pedal value and therefore, if required, the initiation of a downshift of the transmission dependent upon the actual deceleration requests to the brakes and therefore in dependence upon the instantaneous driving situation whereby the downshift time point can be optimized.

BRIEF DESCRIPTION OF THE DRAWINGS

The invention will now be described with reference to the drawings wherein.

DESCRIPTION OF THE PREFERRED EMBODIMENTS OF THE INVENTION

Figure 1B:
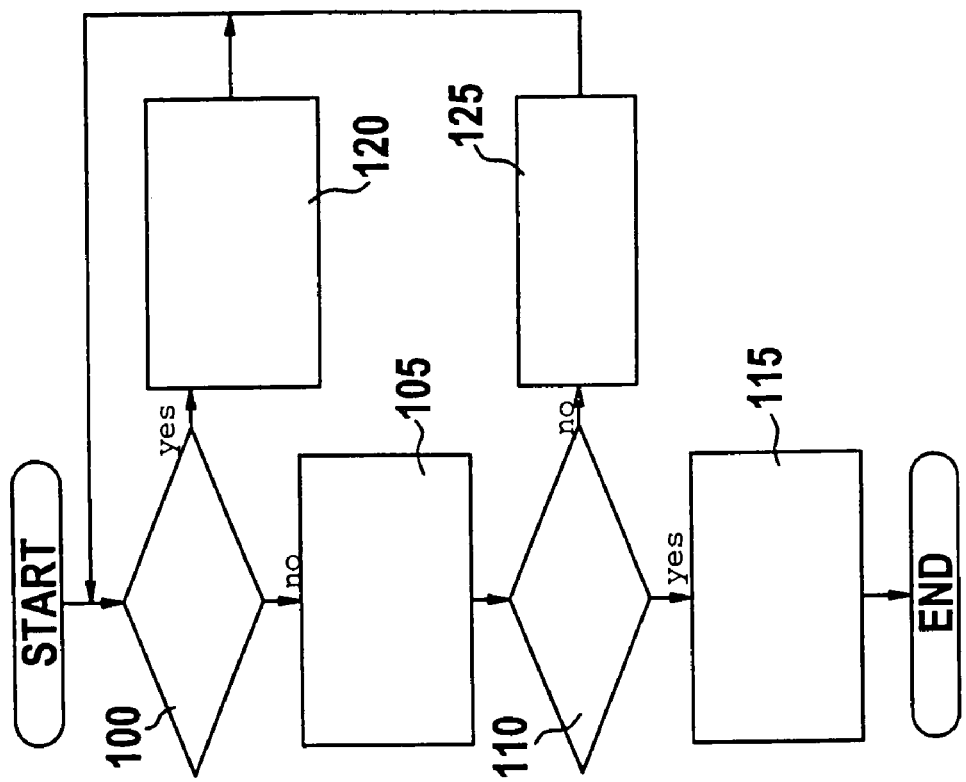
FIG. 1b is a flowchart corresponding to FIG. 1a for describing a first embodiment of the method of the invention.
Figure 1A:
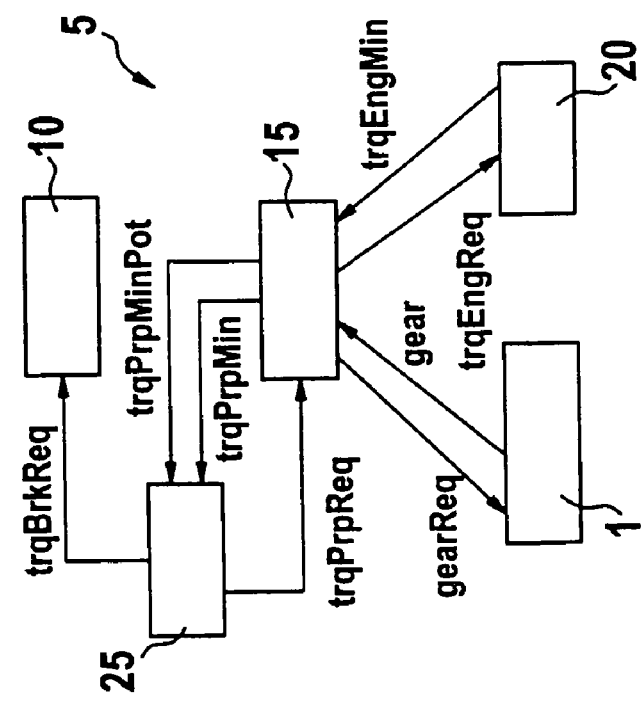
FIG. 1a is a first simplified block diagram of a vehicle.

In FIG. 1a, reference numeral 5 identifies a vehicle having a drive unit 15. The drive unit 15 is connected to a motor 20 which, for example, can be an internal combustion engine, an electric motor or a desired other alternative drive concept. The configuration as an internal combustion engine can, for example, be a diesel engine or a spark-ignition engine. The drive unit 15 is further connected to a transmission 1 of the vehicle 5. The vehicle 5 furthermore includes a vehicle speed controller 25. The vehicle speed controller 25 is, in turn, connected to a brake system 10 and, on the other hand, to a drive unit 15. The brake system 10 is, in the following, referred to simply as a brake. The vehicle speed controller 25 has the task to cause the actual speed of the vehicle 5 to track a desired speed. The desired speed can be set by the driver of the vehicle 5, for example, by means of a lever of the vehicle speed control (tempomat lever). The desired speed can, however, be dependent upon the vehicle in traffic moving ahead of the present vehicle in the case of an adaptive vehicle speed control in a manner known per se. The vehicle speed controller 25 requests a desired value for an output value of the drive unit 15 for causing the actual speed to track the desired speed. This output quantity can, for example, be a drive torque or a drive power or an output quantity of the drive unit 15 or of the vehicle 5 which is derived from one of the above quantities.

In the following, it should be assumed by way of example that the output quantity, which is requested by the vehicle speed controller 25, is a resulting drive torque whose desired value is identified hereinafter by trqCrCtReq and whose realization by the vehicle speed controller 25 is realized, on the one hand, via a specific request of a drive torque in accordance with a desired value trqPrpReq and, on the other hand, via a request of a desired value trqBrkReq for a brake torque which is to be developed by the brake system 10. With respect to the above, the following applies:

$$trqCrCtReq = trqPrpReq + trqBrkReq \qquad (0)$$

For realizing the desired value trqPrpReq for the drive torque, the drive unit 15 requests a desired value trqEngReq for the engine torque from the motor 20 and a gear or a shift stage gearReq from the transmission 1. Here, the following applies:

$$trqPrpReq = trqEngReq * rat(gearReq) \qquad (1)$$

wherein rat(gear) is the transmission ratio of the transmission 1 for the requested gear or the requested shift stage of the transmission 1. The realization of this desired value trqEngReq for the motor torque, which is requested by the drive unit 15, takes place in a manner known per se, for example, via a corresponding setting of the ignition time point and/or of the air supply in the case of a gasoline engine or the injection quantity or the injection time point in the case of the diesel engine. The transmission 1 supplies the drive unit 15 with data as to the instantaneously set gear or the instantaneously set shift stage (gear). The engine 20 supplies the drive unit 15 with data as to the instantaneous overrun torque trqEngMin of the engine 20 for the instantaneous set gear (gear). The transmission ratio of the transmission 1 for the different possible adjustable gears or shift stages is stored in the drive unit 15, for example, in a memory (not shown) and is known. From the instantaneously set shift stage (gear) and the overrun torque trqEngMin of the engine 20 in the instantaneously set gear, the drive unit 15 determines the overrun torque trqPrpMin for the instantaneously set gear as follows:

$$trqPrpMin = trqEngMin * rat(gear) \qquad (2)$$

wherein (gear) is, as described, the instantaneously set gear or the instantaneously shift stage of the transmission 1. The overrun torques trqPrpMin of the drive unit 15 and therefore of the drive of the vehicle 5 can also be stored in a characteristic field of the drive unit 15 for the individual possible shift stages of the transmission 1 so that these overrun torques must not be computed anew for each instantaneous gear (gear). With the information as to the overrun torque trqPrpMin for the instantaneously set gear (gear) the drive unit 15 supplies also a datum as to the overrun torque trqPrpMinPot of the drive unit 15 to the vehicle speed controller 25 which would result in accordance with the described characteristic field for the next lower gear. The overrun torque trqPrpMinPot for the next lower gear can, however, be computed in the drive unit 15 as follows:

$$trqPrpMinPot = trqEngMin * rat(gear-1) \qquad (3)$$

wherein rat(gear-1) is the transmission gear ratio of the transmission 1 at the next lower permitted gear.

The described example defines a vehicle speed controller 25 having a brake intervention. The example permits, however, also an application for a road speed controller without brake intervention when the desired value trqBrkReq for the brake torque, which is requested by the vehicle speed controller 25, is permanently set to zero. In this case, the desired value trqPrpReq for the drive torque, which is requested by the vehicle speed controller 25, is equal to the desired value trqCrCtReq for the resulting drive torque.

In the following, and with reference to the flowchart of FIG. 1b, the sequence of the method of the invention for the first embodiment of FIG. 1a is described. After the start of the program, the vehicle speed controller 25 checks at program point 100 whether the desired value trqCrCtReq for the resulting drive torque, which is requested by the vehicle speed controller 25, is greater than the overrun torque trqPrpMin of the drive unit 15 in the instantaneous gear (gear). If this is the case, then the program branches to program point 120; otherwise the program branches to a program point 105.

At program point 105, the vehicle speed controller 25 detects a so-called braking case wherein the actual speed must be reduced in order to track the actual speed to the desired speed. Here, the vehicle speed controller 25 sets the desired value trqPrpReq for the drive torque equal to the overrun torque trqPrpMin in the instantaneous gear (gear) and the desired value trqBrkReq for the brake torque as follows:

$$trqBrkReq = trqCrCtReq - trqPrpMin \qquad (4)$$

Thereafter, there is a branching of the program to program point 110. At program point 110, the vehicle speed controller 25 checks whether the desired value trqCrCtReq for the resulting drive torque is also less than the overrun torque trqPrpMinPot of the drive unit 15 in the next lower gear. If this is the case, then the program branches to program point 115; otherwise, the program branches to a program point 125.

At program point 115, a downshift of the transmission 1 by one gear or by one shift stage is initiated in that the vehicle speed controller 25 requests from the drive unit 15 the overrun torque trqPrpMinPot of the next lower gear as the desired value trqPrpReq for the drive torque and thereupon, the drive unit 15 requests the setting of the next lower gear by the transmission 1 via the request gearReq with:

$$gearReq = gear - 1 \qquad (5)$$

Further, at program point 115, the desired value trqBrkReq for the brake torque is set as follows:

$$trqBrkReq = trqCrCtReq - trqPrpMinPot \qquad (6)$$

In this way, the required brake torque is reduced in magnitude via the downshift and therefore the brake is protected against wear and overheating and, simultaneously, the requested desired value trqCrCtReq for the resulting drive torque is realized. With the downshifting, the drive torque trqPrpReq, which is directly requested by the vehicle speed controller 25 from the drive unit 15, is set back from the overrun torque of the instantaneous gear to the overrun torque of the next lower gear. For this reason, no adaptation of the engine torque trqEngReq, which is requested by the drive unit 15, is required. After program point 115, there is a movement out of the program.

At program point 120, the drive case is detected wherein the desired value trqBrkReq for the brake torque is set to zero and the desired value trqPrpReq for the drive torque is set equal to the desired torque trqCrCtReq for the resulting drive torque. In this case, a change of the desired value trqEngReq for the engine torque is required and also wanted and results in:

$$trqEngReq = trqPrpReq / rat(gear) \qquad (7)$$

Thereafter, the program branches back to program point 100. At program point 125, no reaction takes place and there is a back branching to program point 100.

For the case that the vehicle speed controller 25 has no possibility of acting on the brake system 10, then, for the flowchart of FIG. 1*b*, the desired value trqBrkReq for the brake torque is set permanently to zero so that, in this case, a reduction of the actual speed for tracking the desired speed can be realized only with the aid of the overrun torque of the drive unit 15 and by satisfying the condition in the program step 110 by downshifting the transmission. The desired value trqCrCtReq for the resulting drive torque requested by the vehicle speed controller 25 can be realized essentially only for the case when this desired value corresponds to the overrun torque of the instantaneously set gear or of the next lower gear for which purpose the condition in program step 110 can also be modified so that the vehicle speed controller 25 checks whether the desired value trqCrCtReq for the resulting drive torque is less than or equal to the overrun torque trqPrpMinPot of the next lower gear.

In the case of a vehicle speed controller 25 with brake intervention, there results with the described flowchart of FIG. 1*b*, the fulfillment of the request of a continuous course for the realization of the desired value trqCrCtReq for the resulting drive torque based on the sum of the requested brake torque trqBrkReq and the requested drive torque trqPrpReq whereby, at program point 115, a comfortable downshift is ensured.

Figure 2B:
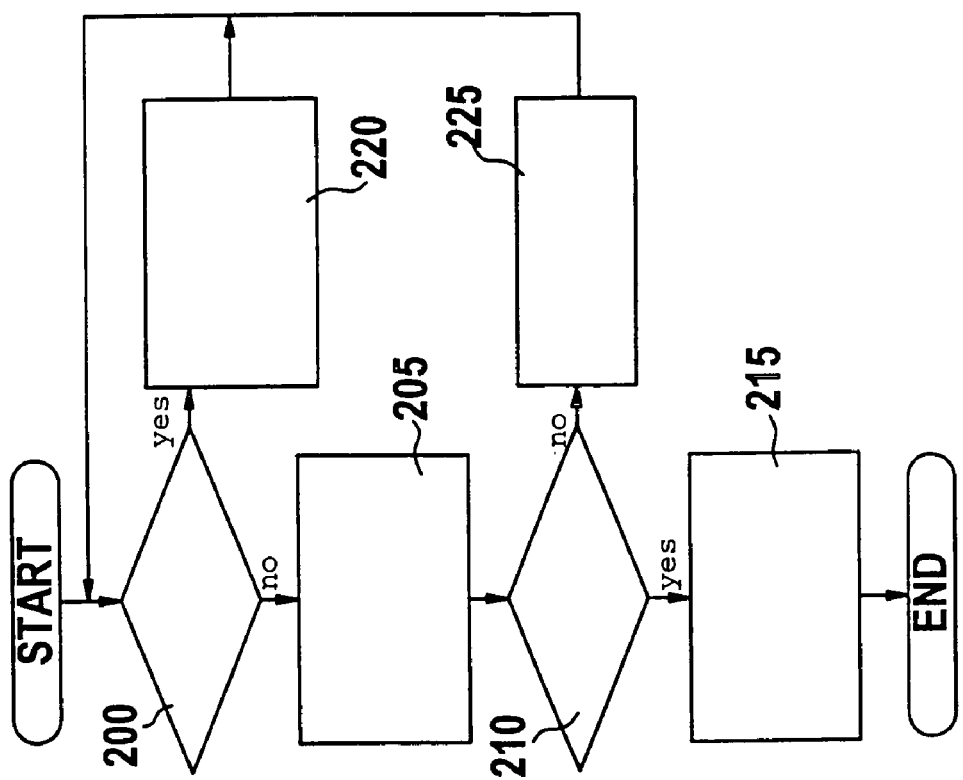
FIG. 2b is a corresponding flowchart of a second embodiment of the method of the invention.
Figure 2A:
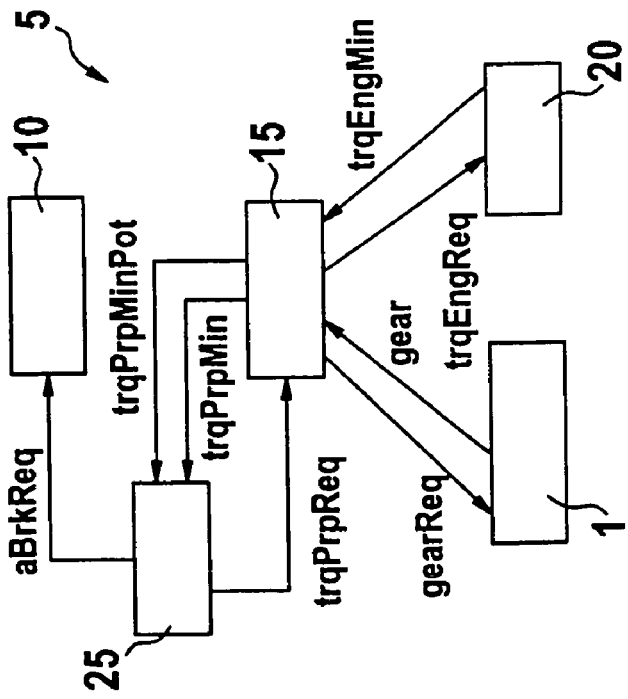
FIG. 2a is a second simplified block diagram of a vehicle.

Except for the described torque interface to the brake system 10, there is also the possibility of an acceleration interface according to the second embodiment of FIG. 2*a* wherein the same reference numerals identify the same elements as in FIG. 1*a* and, with respect to FIG. 1*a*, changes are only with respect to the interface between the vehicle speed controller 25 and the brake system 10. In lieu of a desired value for the brake torque, the vehicle speed controller 25 requests in an example of FIG. 2*a* a brake deceleration from the brake system 10. This desired value for the brake deceleration is identified as aBrkReq. In this case, the vehicle speed controller 25 has no data as to the brake torque to be developed by the brake system 10. In this way, for the embodiment of FIG. 2*a*, a changed flowchart according to FIG. 2*b* results. After the start of the program, a check is made by the vehicle speed controller 25 at program point 200 as to whether the desired value trqCrCtReq for the resulting drive torque, which is requested by the vehicle speed controller 25, is greater than the overrun torque trqPrpMin in the instantaneous gear. If this is the case, then the program branches to program point 220; otherwise, the program branches to a program point 205.

At program point 205, the braking case is present and the actual speed must be reduced to track the desired speed. In this case, the desired value trqPrpReq for the drive torque, which is requested by the vehicle speed controller 25, is set equal to the overrun torque trqPrpMin in the instantaneous gear. In contrast, the deceleration request aBrkReq is determined from a characteristic field as a function of the desired value trqCrCtReq for the resulting drive torque. The characteristic field is applied, for example, on a test stand and can be applied in such a manner that the sum of the overrun torque trqPrpMin in the instantaneous gear and the brake torque, which corresponds to the requested brake deceleration aBrkReq, forms the requested desired value trqCrCtReq for the resulting drive torque. Thereafter, the program branches to program point 210.

At program point 210, the vehicle speed controller 25 checks whether the desired value trqCrCtReq for the resulting drive torque is less than or equal to the overrun torque trqPrpMinPot of the next lower gear. If this is the case, then the program branches to program point 215; otherwise, the program branches to program point 225.

At program point 215, a downshift takes place. The vehicle speed controller 25 requests the overrun torque trqPrpMinPot of the next lower gear from the drive unit 15 as the desired value trqPrpReq for the drive torque and, thereafter, the drive unit 15 requests the transmission 1 to downshift into the next lower gear in accordance with gearReq=gear−1, so that the engine torque need not be changed in order to realize the requested desired value trqPrpReq for the drive torque. In correspondence to the above-described characteristic field, the deceleration request aBrkReq is, as before, determined as a function of the desired value trqCrCtReq for the resulting drive torque. A jump back to the deceleration requests of the previous shift stage of the transmission 1 takes place in this characteristic field when there is a drop below the overrun torque trqPrpMinPot of the next lower gear by the desired value trqCrCtReq so that the brake system is protected against wear and overheating. Thereafter, there is a movement out of the program.

At program point 220, the drive case is detected wherein no deceleration request aBrkReq is made and, as in the case of the program point 120 of FIG. 1b, the desired value trqPrpReq for the drive torque is set to the desired value trqCrCtReq for the resulting drive torque and the desired value trqEngReq for the engine torque is set equal to trqPrpReq/rat(gear). Thereafter, the program branches back to program point 200.

At program point 225, no reaction takes place and the program branches back to program point 200.

As an alternative to the inquiries at program point 110 according to FIG. 1b and program point 210 of FIG. 2b, a check can be made in the above-mentioned program points, for example, with the aid of a timer as to whether, since the detection of the braking case according to program point 105 in FIG. 1b or program point 205 in FIG. 2b, a pregiven time has been exceeded without the braking case being disabled, that is, without the desired value trqCrCtReq for the resulting drive torque having again exceeded the overrun torque trqPrpMin of the instantaneous gear. Accordingly, if the brake case is still present after the pregiven time, then there is a branching of the program to program point 115 in accordance with FIG. 1b and a branching to program point 215 in accordance with FIG. 2b. If, in contrast, the pregiven time is not yet elapsed in the brake case, then there is a branching to program point 125 in the case of FIG. 1b and a branching to program point 225 in the case of FIG. 2b. The pregiven time can likewise be suitably applied. The time is to be advantageously so selected that, for short-time brake interventions as they are present, as a rule, for a gradual drop in elevation, no downshift is requested, however, for brake interventions which take longer, a brake supporting downshift takes place.

A further variation or embodiment is obtained when using a transmission control for the transmission 1 which permits no direct gear input via the drive unit 15; instead, the transmission control itself inputs the gear to be set in dependence upon a virtual accelerator pedal angle ratAccPed and further parameters which can vary depending upon the manufacturer of the transmission control apparatus. As additional parameters, the engine rpm (n) and an engine torque at full-load operation or at part-load operation can be applied in a manner known per se. Up to now, such a virtual accelerator pedal is utilized only for requesting a downshifting for a propulsion request and, in the braking case, is usually set unused to zero. According to the invention, in a third embodiment of FIGS. 3a and 3b, it is provided to achieve a downshifting by inputting a high value for the accelerator pedal angle.

Figure 3B:
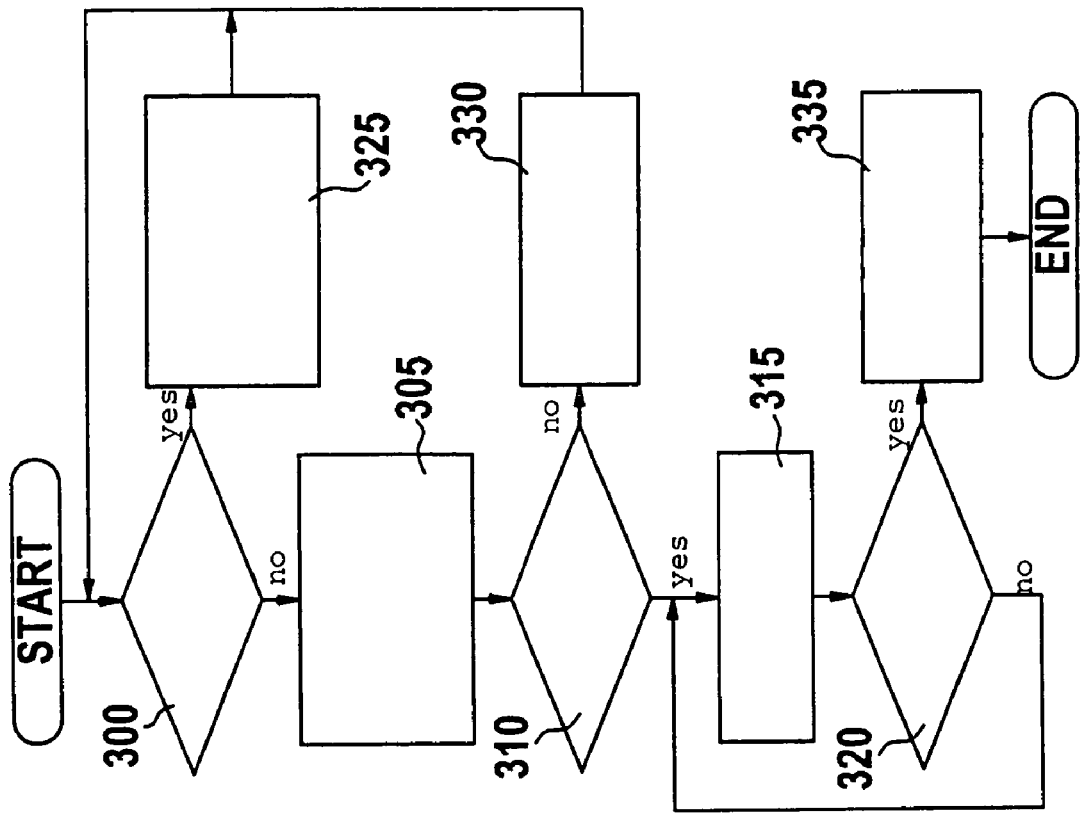
FIG. 3b shows a corresponding flowchart for a third embodiment of the method of the invention.
Figure 3A:
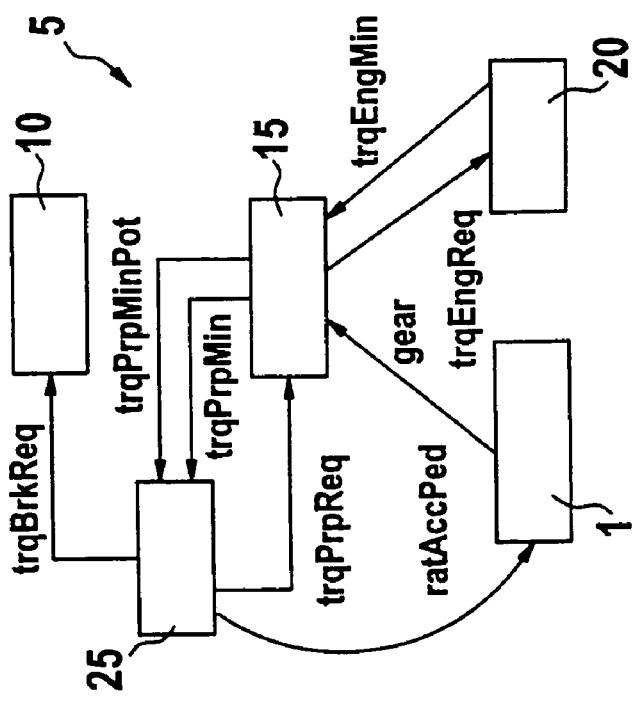
FIG. 3a shows a third simplified block diagram of a vehicle.

In the embodiment of FIG. 3a, the same reference numerals identify the same elements as in the first embodiment of FIG. 1a. The third embodiment of FIG. 3a differs from the first embodiment of FIG. 1a only in that no request gearReq for setting a shift stage of the transmission 1 is any longer outputted to the transmission 1 by the drive unit 15; instead, a virtual accelerator pedal angle or an accelerator pedal value ratAccPed is outputted to the transmission control of the transmission 1 from the vehicle speed controller 25. The transmission control of the transmission 1 is not shown separately in FIG. 3a for reasons of clarity.

According to FIG. 3b, a flowchart for the method of the third embodiment is presented. After the start of the program, the vehicle speed controller 25 checks at program point 300 as to whether the desired value trqCrCtReq of the resulting drive torque is greater than the overrun torque trqPrpMin of the drive unit 15 for the instantaneous gear. If this is the case, then the program branches to program point 325; otherwise, the program branches to program point 305. At program point 305, the brake case is detected and the vehicle speed controller 25 requests the overrun torque trqPrpMin of the drive unit 15 for the instantaneous gear as the desired value trqPrpReq for the drive torque and as the desired value trqBrkReq for the braking torque:

$$\text{trqBrkReq}=\text{trqCrCtReq}-\text{trqPrpMin}.$$

Thereafter, the program branches to program point 310. At program point 310, the vehicle speed controller 25 checks whether the desired value trqCrCtReq of the resulting drive torque is less than or equal to the overrun torque trqPrpMinPot of the drive unit 15 for the next lower gear. If this is the case, then the program branches to program point 315; otherwise, the program branches to program point 330.

At program point 315, the vehicle speed controller 25 causes an incremental increase of the accelerator pedal value ratAccPed by incremental value ratDiff in accordance with:

$$\text{ratAccPed}=\text{ratAccPed}+\text{ratDiff} \qquad (8)$$

Thereafter, the program branches to program point 320. At program point 320, the vehicle speed controller checks based on the overrun torque trqPrpMin of the instantaneous gear which is transmitted by the drive unit 15, as to whether a downshift has taken place. If this is the case, then the program branches to program point 335; otherwise, the program branches to program point 315.

In this way, and in the case of satisfying the condition of program point 310, the accelerator pedal value is increased until this value leads to a downshift of the transmission 1 in accordance with the known function of the virtual accelerator pedal.

At program point 335, the new overrun torque of the drive unit 15 after the downshift is requested by the vehicle speed controller 25 as the desired value trqPrpReq for the drive torque in accordance with trqPrpReq=trqPrpMinPot. Correspondingly, the following is requested for the desired value trqBrkReq of the brake torque:

$$\text{trqBrkReq}=\text{trqCrCtReq}-\text{trqPrpMinPot}.$$

In this way, the same effect results as in the embodiment of FIG. 1. The input trqCrCtReq for the resulting drive torque can be continuously realized without it being necessary to change the engine torque. After the downshifting, the magnitude of the brake torque is reduced as in the first embodiment and the brake system 10 is thereby protected against wear and overheating. After the downshifting, the accelerator pedal value is maintained unchanged in order to maintain the switching state except if the desired value trqCrCtReq for the resulting drive torque again increases above the overrun torque trqPrpMinPot of the downshifted transmission 1 so that the accelerator pedal value can be again reduced. If, however, the magnitude of the brake torque continues to increase further after the downshifting of the transmission 1 in correspondence to a dropping of the desired value trqCrCtReq of the resulting drive torque, then a further downshift can become necessary if there is a drop below the overrun torque of the next lower gear by the desired value trqCrCtReq of the resulting drive torque, for which downshift a further increase of the accelerator pedal value is necessary.

There is a movement out of the program after program point 335.

At program point 325, the drive case is present and the desired value trqBrkReq for the brake torque is equal to zero. Furthermore, the desired value trqPrpReq for the drive torque, which is requested by the vehicle speed controller 25, is equal to the desired value trqCrCtReq of the resulting drive torque and the desired value trqEngReq for the engine torque is equal to trqPrpReq/rat(gear).

In the drive case, the accelerator pedal value can be used for the drive in a manner known per se. ratAccPed is a function of the desired value trqCrCtReq of the resulting drive torque. Thereafter, the program branches back to program point 300.

At program point 330, no reaction takes place and, thereafter, the program branches back to program point 300.

Figure 4B:
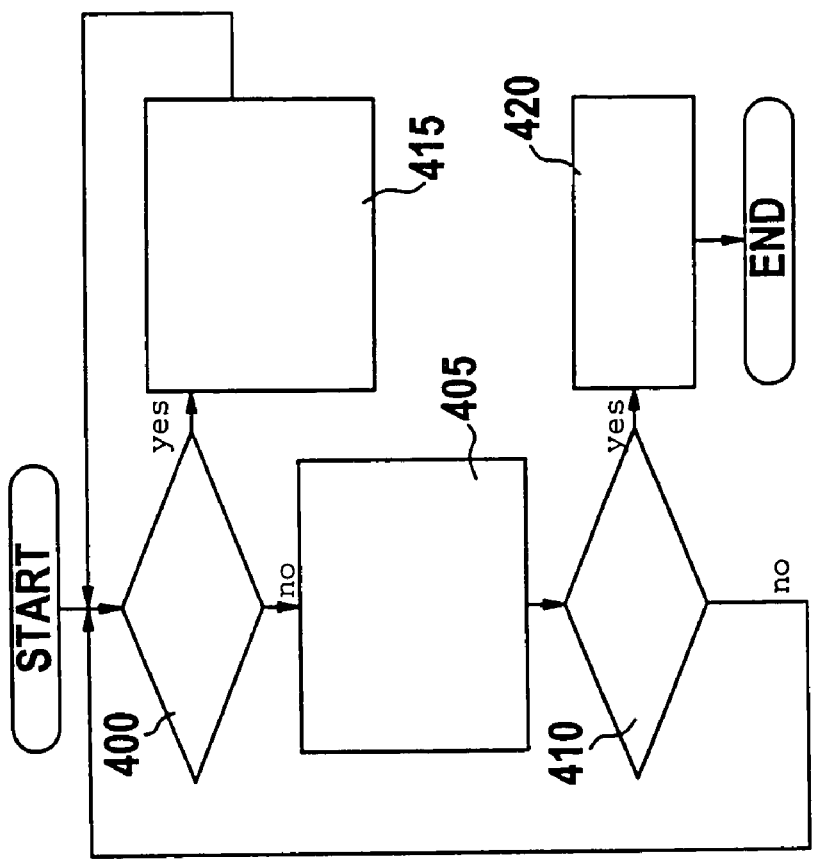
FIG. 4b shows a corresponding flowchart of a fourth embodiment of the method of the invention.
Figure 4A:
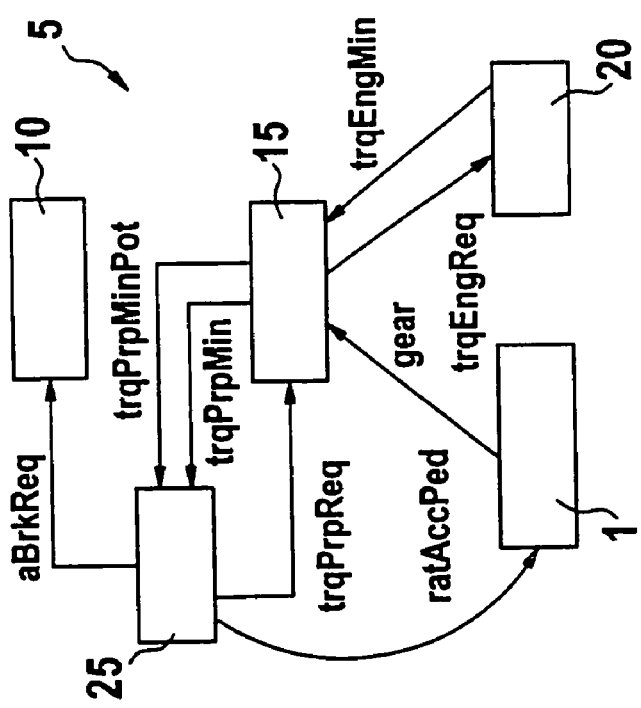
FIG. 4a shows a fourth block diagram of a vehicle.

A fourth embodiment of FIGS. 4a and 4b results from the combination of the acceleration interface, which is known from the second embodiment, between the vehicle speed controller 25 and the brake system 10 with the accelerator pedal interface, which is known from the third embodiment, between the vehicle speed controller 25 and the transmission 1. In this case, neither data as to the required braking torque is available nor can the time point of the gear change be inputted because this time point is determined by the transmission control apparatus on the basis of the accelerator pedal value. In this case, in order to also initiate a downshifting of the transmission 1, one increases the accelerator pedal value as soon as the brake system 10 is driven.

According to the fourth embodiment of FIG. 4a, the same reference numerals identify the same elements as in FIG. 2a. The only difference of the fourth embodiment of FIG. 4a compared to the second embodiment of FIG. 2a is that in the fourth embodiment of FIG. 4a, no gear request gearReq or shift request from the drive unit 15 to the transmission 1 takes place; instead, the transmission control (not shown) of the transmission 1 as in the third embodiment of FIG. 3, determines the shift request from an accelerator pedal value ratAccPed, which is received by the vehicle speed controller 25 and, if required, additional quantities, which are pregiven by the manufacturer of the transmission control apparatus, such as the engine rpm (n) and/or an engine torque at full-load operation or at part-load operation.

FIG. 4b shows a flowchart for the sequence of the method of the invention according to the fourth embodiment.

After the start of the program, the vehicle speed controller 25 checks at program point 400 as to whether the desired value trqCrCtReq of the resulting drive torque is greater than the overrun torque trqPrpMin of the drive unit 15 for the instantaneous gear (gear). If this is the case, then the program branches to a program point 415; otherwise, the program branches to program point 405. At program point 405, the braking case is detected and the desired value trqPrpReq for the drive torque is set by the vehicle speed controller 25 to the overrun torque trqPrpMin for the drive unit 15 for the instantaneous gear (gear). Furthermore, and as in the embodiment of FIG. 2, the input aBrkReq for the brake deceleration is adjusted as function of the desired value trqCrCtReq of the resulting drive torque by the vehicle speed controller 25. The vehicle speed controller 25 further increases the accelerator pedal value ratAccPed proportionally to the difference between the initial deceleration request when the brake system 10 is activated by the vehicle speed controller 25 and the instantaneous deceleration request aBrkReq. The initial deceleration request is characterized by aBrkReqStart. In this way, the accelerator pedal value ratAccPed, which is adjusted at program point 405, results as follows:

$$ratAccPed=ratAccPed+Prat*(aBrkReqStart-aBrkReq) \quad (9)$$

wherein Prat is a proportionality factor which can be suitably applied.

Equation (9) makes possible a large increase of the accelerator pedal value ratAccPed for the case that the instantaneous deceleration request aBrkReq increases greatly in magnitude compared to the initial acceleration request aBrkReqStart, for example, where there is a sharp drop in elevation. For a gradual drop in elevation with a comparatively low increase of the magnitude of the instantaneous acceleration request aBrkReq compared to the initial deceleration request aBrkReqStart, in contrast, the accelerator pedal value ratAccPed is increased only slightly. If, in contrast, the instantaneous deceleration request aBrkReq remains unchanged in comparison to the initial deceleration request aBrkReqStart or the instantaneous deceleration request drops in magnitude compared to the initial deceleration request aBrkReqStart, the accelerator pedal value ratAccPed remains the same or likewise drops. The more-the accelerator pedal value ratAccPed increases, the earlier a downshift can be triggered by the transmission control in order to relieve the brake system 10 of load. The downshift takes place when the accelerator pedal value ratAccPed exceeds a pregiven value. This is checked by the vehicle speed controller 25 in the next program point 410 based on the instantaneous overrun torque trqPrpMin which changes to the overrun torque trqPrpMin Pot of the next lowest gear when downshifting. If the vehicle speed controller 25 determines at program point 410 that a downshift has taken place, then the program branches to program point 420; otherwise, the program branches back to program point 400. The deceleration request aBrkReqStart, which is used at program point 405, is the value for the deceleration request which is used at the start of the braking operation initiated by the vehicle speed controller 25 and is maintained with a new runthrough of the program point 405 except when the braking case was interrupted in the meantime by a drive case in accordance with the program point 415 described below and, for a new braking case, a new initial deceleration request aBrkReqStart must be determined.

The measures, which are to be taken at program point 420, correspond to the measures described at program point 335 in accordance with the flowchart of FIG. 3b.

At program point 415, the drive case is present. In this case, no deceleration request aBrkReq from the vehicle speed controller 25 is outputted to the brake system 10. The vehicle speed controller 25 requests the desired value trqCrCtReq for the resulting drive torque as the desired value trqPrpReq for the drive torque. The desired value trqEngReq for the engine torque is then as follows:

$$trqEngREq=trqPrpReq/rat(gear).$$

The accelerator pedal value ratAccPed is determined in a manner known per se as the function of the desired value trqCrCtReq of the resulting drive torque. Thereafter, the program branches back to program point 400.

The described method is not limited to a pregiven interface between the participating components, namely: the vehicle speed controller 25, the brake system 10, the drive unit 15 and the transmission 1; instead, the method can be used with the described adaptations for any desired combination of the interface between the vehicle speed controller 25 and the braking system 10 and the interface between the vehicle speed controller 25 and the transmission 1. As described, the interface between the vehicle speed controller 25 and the brake system 10 can be configured, for example, as an acceleration interface or as a torque interface. The interface between the vehicle speed controller and the transmission 1 can, for example, be realized with the aid of the accelerator pedal value or via the drive unit 15 with the aid of a gear input.

Additional uses become evident from the adaptation of the described method of the invention to a vehicle speed controller without brake intervention. In this case, for the described embodiments, the desired value trqBrkReq for the brake torque or the deceleration request aBrkReq are set equal to zero and therefore, when the actual speed tracks the desired speed in the case of a required reduction of the actual speed, this takes place not continuously, but only stepwise with the aid of downshift operations of the transmission 1. These downshift operations, however, effect the use of different overrun torques for the drive unit 15 depending upon the drop in elevation and therewith a lesser control deviation between the actual speed and the desired speed when driving downhill.

It is understood that the foregoing description is that of the preferred embodiments of the invention and that various changes and modifications may be made thereto without departing from the spirit and scope of the invention as defined in the appended claims.

What is claimed is:

1. A method for controlling the speed of a vehicle traveling at an actual speed, the method comprising the steps of:
   causing the actual speed of said vehicle to track a desired speed;
   driving a transmission of said vehicle to downshift to reduce said actual speed; and,
   additionally driving a brake system of said vehicle to reduce said actual speed.

2. A method for controlling the speed of a vehicle traveling at an actual speed, the method comprising the steps of:
   causing the actual speed of said vehicle to track a desired speed;
   driving a transmission of said vehicle to downshift to reduce said actual speed;
   additionally driving a brake system of said vehicle to reduce said actual speed;
   driving said transmission for downshifting in dependence upon an accelerator pedal value; and,
   wherein said accelerator pedal value is changed in dependence upon a difference between an initial deceleration request when activating said brake system and an instantaneous deceleration request of said brake system.

3. The method of claim 1, wherein said vehicle includes a control system for controlling said actual speed and a drive unit for supplying an output quantity in response to a request of said control system, the method comprising the further step of driving said brake system when said output quantity of said drive unit of said vehicle lies below a first value thereof adjusted for an overrun operation in the particular gear stage of said transmission which is then engaged.

4. The method of claim 3, wherein said output quantity is a drive torque.

5. The method of claim 3, comprising the further step of driving said transmission to downshift when said output quantity of said drive unit drops below a second value which can be expected to adjust for the overrun operation in the next lower gear stage.

6. The method of claim 1, comprising the further step of driving said transmission to downshift after a pregiven time after the start of driving said brake system to reduce said actual speed.

7. The method of claim 1, comprising the further step of driving said transmission for downshifting in dependence upon an accelerator pedal value.

8. The method of claim 7, comprising the further step of iteratively increasing said accelerator pedal value for a requested downshifting of said transmission.

* * * * *